(No Model.)  2 Sheets—Sheet 1.

J. H. WHITAKER.
TUBULAR SAWING MACHINE.

No. 342,661. Patented May 25, 1886.

WITNESSES:
W. W. Hollingsworth
Edw. W. Byrn.

INVENTOR:
J. H. Whitaker
BY Munn & Co.
ATTORNEYS.

N. PETERS, Photo-Lithographer, Washington, D. C.

(No Model.)  J. H. WHITAKER.  2 Sheets—Sheet 2.
TUBULAR SAWING MACHINE.

No. 342,661.  Patented May 25, 1886.

WITNESSES:
W. W. Hollingsworth
Edw. W. Byrn

INVENTOR:
John H. Whitaker
BY Munn & Co
ATTORNEYS.

UNITED STATES PATENT OFFICE.

JOHN H. WHITAKER, OF DAVENPORT, IOWA.

TUBULAR SAWING-MACHINE.

SPECIFICATION forming part of Letters Patent No. 342,661, dated May 25, 1886.

Application filed February 2, 1886. Serial No. 190,613. (No model.)

*To all whom it may concern:*

Be it known that I, JOHN H. WHITAKER, a citizen of the United States, residing at Davenport, in the county of Scott and State of Iowa, have invented a new and useful Sawing-Machine, of which the following is a specification.

Figure 1:
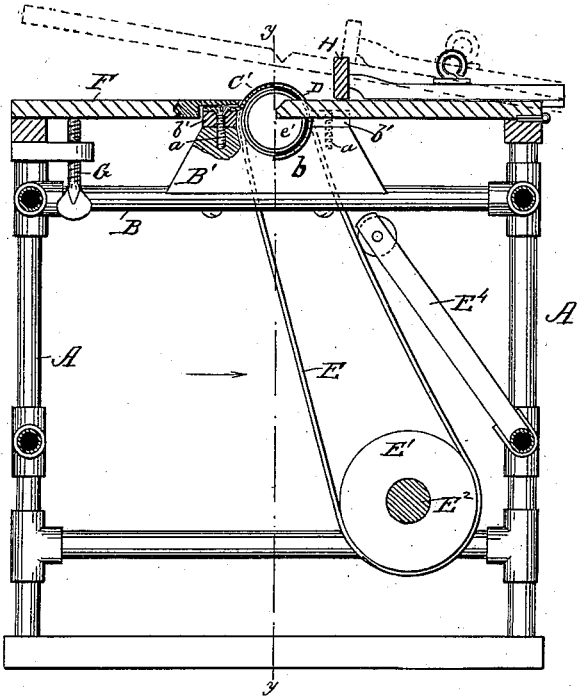
Figure 2:
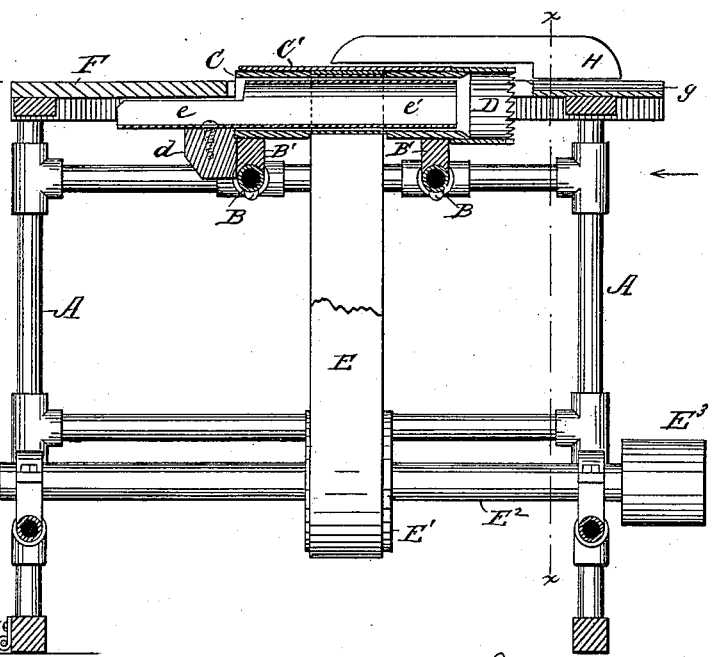
Figure 3:
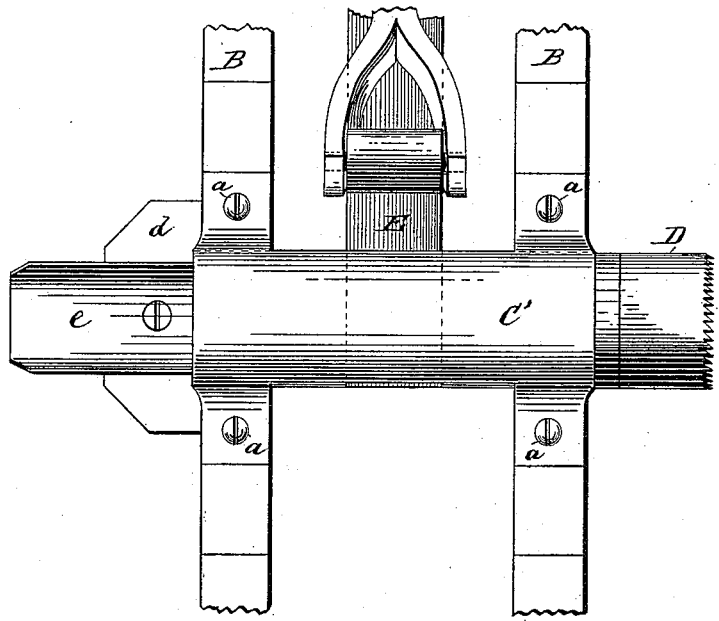
Figure 4:
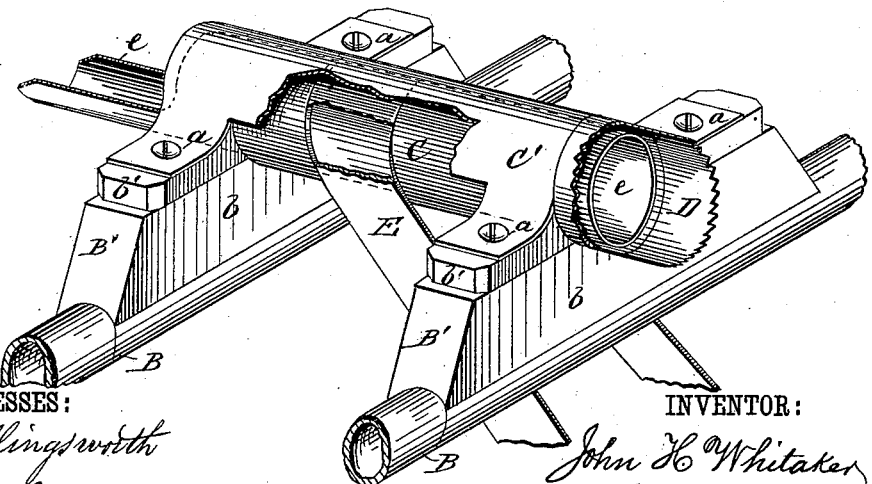

Figure 1 is a vertical section at right angles to the saw-mandrel through line $x\,x$, Fig. 2. Fig. 2 is a vertical section longitudinally through the saw-mandrel through $y\,y$, Fig. 1. Fig. 3 is a plan view of the cylindrical saw, its bearings, and cover; and Fig. 4 is a view in perspective of the same parts.

My invention is in the nature of an improvement in cylindrical sawing-machines in which the teeth are formed on the edge of a cylinder, and the principal object of which is to economize the cutting of moldings, &c.

The invention consists in the peculiar construction and arrangement of parts which I will now proceed to describe.

In the drawings, A represents the frame-work of the machine, which has at the top two cross-bars, B B, upon which are mounted the boxes B' B', in which is journaled the hollow horizontal mandrel C, having at one end the rigidly-attached cylindrical saw D. The journal-boxes are composed of fixed base section $b$, having half-round bearing in it of a diameter to fit the mandrel, with an upper section-block, $b'$, on each side of the mandrel, and extending above the middle line of the same, and a top section or cover, C', which is common to both boxes, and also forms a cover to the mandrel, where it projects above the table. This cover and the upper section-blocks, $b'$, are held down to keep the mandrel in place by screws $a$.

At the end of the mandrel opposite to the saw there is a casting or projection, $d$, bolted or screwed to the frame or journal-box, to which casting is fastened a trough, $e$, which extends inside the mandrel to a point near the saw in the form of a tube, $e'$. The object of this is to receive and guide the cut strip of timber, and allow it to pass out without frictional contact with the revolving mandrel.

Around the depressed or recessed portion of the mandrel, about its middle, is fitted the endless belt E, driven by a pulley, E', on a shaft, E², in the frame-work below, and which shaft has a pulley, E³, that derives its power through a belt from any suitable source. A tension-regulator, E⁴, always keeps the belt tight.

F is the table of the machine, which is hinged to the frame-work on one side, so that it may be turned back to give access to the saw and the mandrel. On the opposite side from its hinges the table rests upon set-screws G G, which are tapped through lugs on the frame-work, and by which the table may be set higher or lower in relation to the saw. A groove or trough, $g$, is made on top of the table in line with the saw, and the gage H is arranged at its side, and is rendered adjustable by a slot and set-screw.

To permit the teeth of the saw to be more conveniently sharpened, the machine is at one side provided with hinges $h$, that secure it to the floor, and by which the machine may be turned upon end for more convenient access to the saw.

Having thus fully described my invention, what I claim as my invention, and desire to secure by Letters Patent, is—

1. The combination, with the tubular saw and its hollow saw-mandrel, of a hollow or tubular stock-guide extending into the saw-mandrel and fitting closely to its inner walls, and a support for the same rigidly connected to the frame-work outside the mandrel, substantially as shown and described.

2. The combination, with the tubular saw and its hollow saw-mandrel recessed upon its outer periphery to receive the driving-belt, of a cover, C, for the same extending over the top of the said mandrel and covering and protecting the belt from the contact of the sawed stock, as set forth.

3. The combination, with the tubular saw and its hollow saw-mandrel recessed upon its outer periphery to receive the driving-belt, of the journal-boxes composed of stationary sections $b$ and removable blocks $b'$, and the saw-mandrel cover $c'$, secured by the same bolts that pass through the sections $b'$ of the journal-boxes, as described.

JOHN H. WHITAKER.

Witnesses:
BYRON WHITAKER,
THOMAS H. LOURY.